United States Patent [19]

Blonstein et al.

[11] Patent Number: 6,016,144

[45] Date of Patent: Jan. 18, 2000

[54] MULTI-LAYERED TELEVISION GRAPHICAL USER INTERFACE

[75] Inventors: Steve Blonstein, Palo Alto; Jack Chaney, Gilroy; Donald Gillespie, San Jose; Eric Wood, Pleasanton, all of Calif.

[73] Assignee: Samsung Electronics Co., Ltd., Suwon, Rep. of Korea

[21] Appl. No.: 08/762,492

[22] Filed: Dec. 9, 1996

Related U.S. Application Data

[60] Provisional application No. 60/023,904, Aug. 14, 1996.

[51] Int. Cl.⁷ .......................... H04N 7/173; H04N 5/445; H04N 5/50
[52] U.S. Cl. .......................... 345/342; 348/906; 348/553; 348/563; 348/564; 345/340; 345/344; 345/346; 455/6.2; 455/6.3; 455/5.1; 455/4.2
[58] Field of Search .......................... 348/906, 553, 348/563, 564, 565, 566, 567, 568, 569, 581, 589, 600, 601, 67, 10; 455/6.2, 6.3, 5.1, 4.2; 345/327, 328, 342, 344, 345, 340, 346, 343; H04N 7/173, 5/445, 5/50

[56] References Cited

U.S. PATENT DOCUMENTS

| | | | |
|---|---|---|---|
| 5,045,843 | 9/1991 | Hansen | 340/709 |
| 5,046,001 | 9/1991 | Barker et al. | 345/327 |
| 5,198,901 | 3/1993 | Lynch | 358/136 |
| 5,265,202 | 11/1993 | Krueger et al. | 395/158 |
| 5,293,229 | 3/1994 | Iu | 348/415 |
| 5,311,310 | 5/1994 | Jozawa et al. | 348/426 |
| 5,359,348 | 10/1994 | Pilcher et al. | 345/327 |
| 5,361,105 | 11/1994 | Iu | 348/699 |
| 5,386,234 | 1/1995 | Veltman et al. | 348/409 |
| 5,400,076 | 3/1995 | Iwamura | 348/416 |
| 5,463,728 | 10/1995 | Blahut et al. | 395/158 |
| 5,489,947 | 2/1996 | Cooper | 348/589 |
| 5,539,479 | 7/1996 | Bertram | 348/564 |
| 5,590,265 | 12/1996 | Nakazawa | 345/327 |
| 5,594,509 | 1/1997 | Florin et al. | 348/906 |
| 5,651,107 | 7/1997 | Frank et al. | 345/327 |
| 5,657,091 | 8/1997 | Bertram | 348/564 |
| 5,678,015 | 10/1997 | Goh | 345/327 |
| 5,694,176 | 12/1997 | Bruette et al. | 348/906 |
| 5,781,246 | 7/1998 | Alten et al. | 348/906 |
| 5,805,163 | 9/1998 | Bagnas | 345/345 |
| 5,872,567 | 2/1999 | Amro | 345/342 |
| 5,892,511 | 4/1999 | Gelsinger et al. | 345/340 |

*Primary Examiner*—John K. Peng
*Assistant Examiner*—Paulos M. Natnael
*Attorney, Agent, or Firm*—Kenneth L. Sherman, Esq.; Sherman & Sherman

[57] ABSTRACT

A TV graphical user interface (GUI) is provided to produce a multi-layered graphical presentation. The TV GUI operates in a channel changer mode to enable a user to tune to a required TV channel, and in a program guide mode to show TV program information. A memory for storing graphics data is capable of storing two graphics planes that represent upper and lower layers of graphics displayable on a TV screen. A graphics accelerator combines the graphics planes to produce various graphical effects on the screen. In the channel changer mode, the right hand side of the upper layer is made transparent to expose graphical buttons produced in the lower layer of graphics. In the program guide mode, the graphical buttons are partially covered by a program guide produced in the upper layer. When the user moves a cursor to the right hand side of the screen, the right hand portion of the program guide is made transparent to fully expose the graphical buttons in the lower layer.

19 Claims, 9 Drawing Sheets

MULTI-LAYERED TELEVISION GRAPHICAL USER INTERFACE

This application claims the benefit of U.S. Provisional Application No. 60/023904 filed Aug. 14, 1996.

TECHNICAL FIELD

The present invention relates to television (TV) systems, and in particular, to a novel TV graphical user interface (GUI) that provides a multi-layered graphical presentation.

BACKGROUND ART

The growing availability of TV broadcast and interactive services creates a need for a new type of a TV control system that would facilitate user access to options offered by TV program providers. For example, direct broadcast satellite services require users to make their selection among about a thousand TV channels with various TV programs and services. Direct television satellite broadcasting is provided via direct broadcast satellites at an uplink frequency of 17.3 to 17.9 GHz and a downlink frequency of 12.2 to 12.7 Ghz.

A digital satellite television system for direct television broadcasting includes a transmitter for transmitting television signals including video and audio components to a satellite. The satellite retransmits the received television signals to an outdoor antenna assembly that includes a dish-like antenna and a block converter. The dish-like antenna directs the received television signals to the block converter that converts the frequencies of the received television signals to respective lower frequencies.

The television signals produced by the block converter are connected via a coaxial cable to an indoor satellite receiver coupled to a TV set. The satellite receiver tunes, demodulates and otherwise processes the received television signals to provide video and audio signals with a NTSC, PAL or SECAM format suitable for processing by the TV set that produces an image on a display screen in response to the video signals, and an audible response by means of speakers in response to the audio signals.

Within the transmitter, analog video and audio signals are converted to respective digital signals compressed according to the Motion Picture Expert Group (MPEG) encoding standard. The resultant digital signals are represented by a stream of packets including error correction data. The type of packets is identified by a header code. Packets corresponding to control data may also be added to the packet stream.

In the MPEG standard, the video information may be transmitted in the form of a luminance (Y) component and two color difference (U and V) components. For example, the first color difference component may represent the difference between the red image information and the luminance image information (R-Y), and the second color difference component may represent the difference between the blue image information and the luminance image information (B-Y). In addition, the color information is compressed because the two color difference components correspond to more than one picture element. The use of color difference components and the sharing of the color difference components between picture elements reduces the transmission bandwidth.

The digital information resulting from the compression and error correction encoding is modulated on a carrier using Quaternary Phase Shift Keying (QPSK) modulation and transmitted to a satellite for retransmission.

The satellite receiver comprises a tuner for selecting the appropriate carrier signal retransmitted by the satellite and for converting the frequency of the selected carrier to an intermediate frequency (IF) signal. A QPSK demodulator demodulates the IF signal and supplies it to an error-correcting decoder to correct demodulated packets representing video and audio information. An MPEG decoder decodes and decompresses video and audio packets to form digital video and audio signals supplied to a TV set. A TV set-top box serves to deliver compressed digital video and audio signals in real time usable form to one or more TV sets.

As the digital satellite television system may provide about 1,000 TV channels with various TV programs and services, a TV graphical user interface (GUI) may be displayed on the screen of a TV set to show a list of TV channels, programs and services. A conventional TV GUI uses a single layer of on-screen display graphics to present TV information. Multiple menus are provided on the screen to enable users to navigate through various types of presented information. Each time a new type of information is required, users should initiate a new menu of options to make a required selection among its options. To support this procedure, the host CPU wipes out the old menu and draws the new one. This reduces the speed of information update on the screen.

Further, such a multi-menu presentation requires a hierarchical menu system with multiple levels of graphical presentation. A hierarchical menu may be provided to allow users to make a selection among various menus. This often causes confusion as the users lose track of what menu they came from and how to get back. Also, it may be difficult to understand on which level of the hierarchical system the GUI currently operates.

Therefore, it would be desirable to provide a TV GUI that produces multiple layers of graphics on a TV screen to eliminate the need for a multi-menu hierarchical system.

Also, to produce various visual effects, it would be desirable to adjust graphical presentation in a higher layer of graphics to expose a predetermined portion of a lower layer of graphics.

DISCLOSURE OF THE INVENTION

Accordingly, one advantage of the present invention is in providing a TV GUI that produces multiple layers of graphics on a TV screen to eliminate the need for a multi-menu hierarchical system.

Another advantage of the present invention is in providing a TV GUI that adjusts graphical presentation in a higher layer of graphics to expose a predetermined portion of a lower layer of graphics.

The above and other advantages of the invention are achieved, at least in part, by providing a television system that comprises a CPU, and a TV monitor controlled by the CPU for displaying a TV program guide in a first layer of graphics, and at least one graphical object in a second layer of graphics underneath the first layer. The size of the TV program guide is adjusted in accordance with a position of a cursor to expose at least a portion of the graphical object.

In accordance with one aspect of the invention, the TV monitor displays a channel selector and the graphical object in a channel selection mode, and the TV program guide and the graphical object in a program guide mode.

The channel selector in the first layer fully exposes the graphical object in the second layer. Whereas, the TV program guide exposes a portion of the graphical object when the cursor is outside a predetermined region on the TV screen. When the cursor is over the predetermined region, the size of the TV program guide is reduced to fully expose the graphical object. For example, a portion of the TV program guide may be made transparent to expose the graphical object or its portion.

The graphical object may comprise an icon for controlling TV operations. The icon is activated when the graphical object is fully exposed. The icon is deactivated when the graphical object is partially covered by the TV program guide.

The TV program guide may comprise TV program objects for indicating TV programs for a first time period when the cursor is outside the predetermined region on the TV screen. Whereas, when the cursor is over the predetermined region, the TV program objects are reduced to indicate TV programs for a second time period less than the first time period.

A graphics data memory may be provided for storing multiple graphics planes that represent multiple layers of graphics to be displayed on the TV screen. A graphics accelerator may combine the graphics planes to produce various graphical effects on the screen.

In accordance with another aspect of the invention, a system for displaying a graphical user interface may comprise a CPU, and a display controlled by the CPU for displaying a first graphical object in a first layer of graphics, and a second graphical object in a second layer of graphics underneath the first layer.

A first predetermined portion of the first graphical object is made transparent in a first mode to expose a predetermined portion of the second graphical object. Whereas, a second predetermined portion of the first graphical object may be made transparent in a second mode to fully expose the second graphical object.

In accordance with a method of the present invention, the following steps are carried out for displaying a graphical user interface:

producing a TV program guide in a first layer of graphics displayed on a TV screen, producing at least one graphical object in a second layer of graphics underneath the first layer, the graphical object being partially covered by the TV program guide, and reducing the size of the TV program guide to fully expose the graphical object when a cursor is moved into a predetermined region on the TV screen.

Thereafter, the size of the TV program guide may be increased to partially cover the graphical object when the cursor is moved out of the predetermined region.

Also, a TV channel selector may be produced in the first layer so as to fully expose the graphical object.

Graphics data displayable in the first and second layers of graphics may be respectively stored in first and second graphics planes of a graphics memory.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

The best mode for practicing the invention is based on the realization of a satellite receiver in a digital satellite television system. However, it is to be understood that the present invention is applicable to any system for receiving TV signals.

Figure 1:
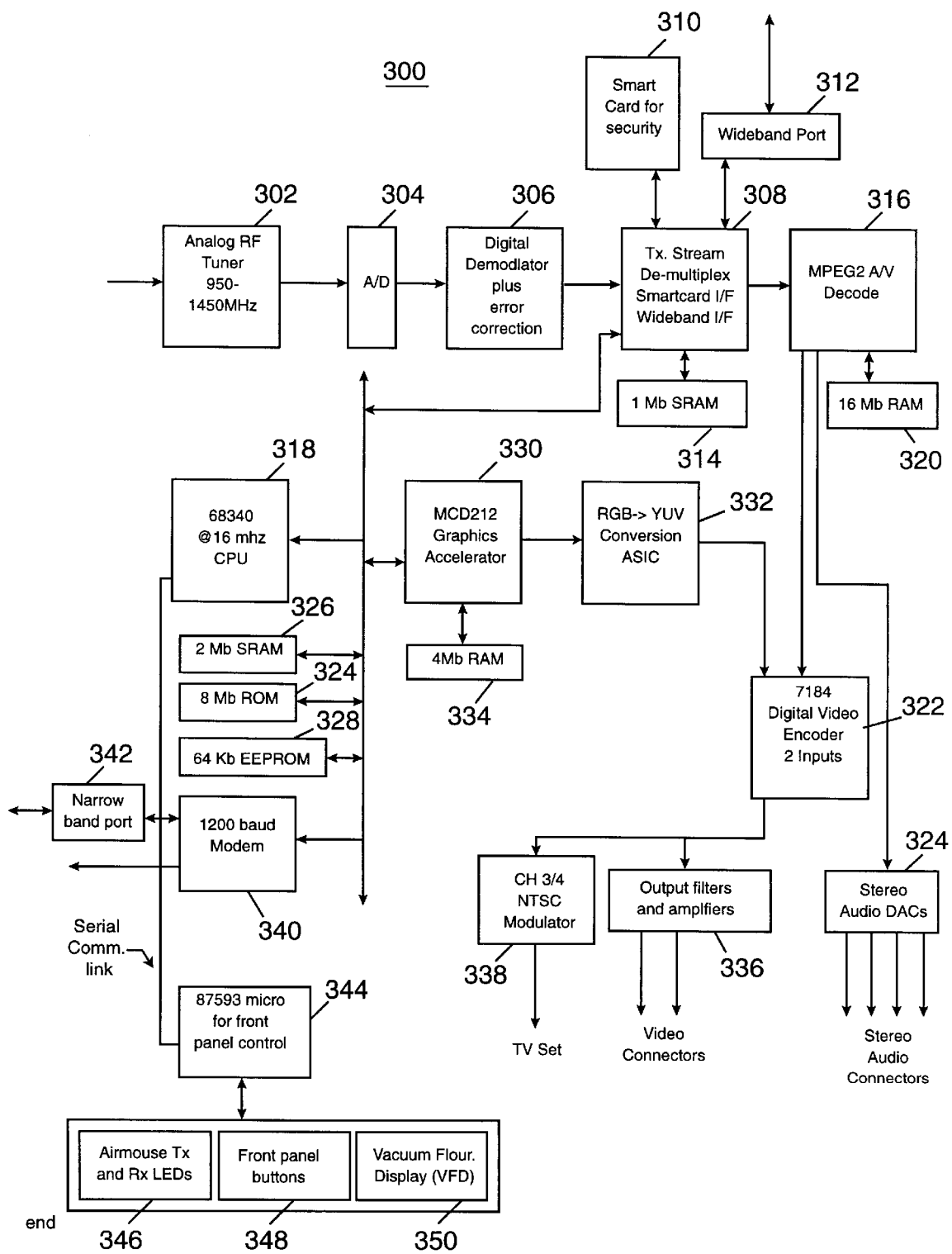
FIG. 1 is a block diagram of a satellite receiver of the present invention.

Reference is now made to FIG. 1 of the drawings wherein an indoor satellite receiver 300 includes an analog radio-frequency (RF) tuner 302 such as a satellite front end demodulator manufactured by Sharp/Comstream. The RF tuner 302 is coupled via an external UHF/VHF to an outdoor unit that receives incoming television signals from a satellite. The outdoor unit may comprise a 18" antenna made of aluminum and dual low noise block converters that convert satellite signals in a frequency range from 12.2–12.7 GHz received by the antenna into the 950–1450 Mhz frequency range signals.

The RF tuner 302 equipped with a local oscillator and mixer selects the appropriate carrier signal corresponding to a selected satellite TV channel from the 950–1450 Mhz signals received from the outdoor unit. The frequency of the selected carrier is converted to an intermediate frequency (IF) signal fed to an analog-digital converter 304 that produces a digital IF signal.

A digital demodulator 306 performs QPSK demodulation of the digital IF signal and carries out multiple error correction algorithms required to decode error correction data contained in the received signal. For example, Viterbi and Reed-Solomon error correction algorithms may be employed. A single ASIC manufactured by Comstream may be used as the digital demodulator 306.

The decoded digital signal is fed to a transport chip 308 responsible for demultiplexing video, audio and data signals. The transport unit 308 is also connected to a card 310 for providing conditional access to the satellite receiver 300. The card 310, such as a Smart Card manufactured by the News Data Corporation, controls access to paid channels and services using the Data Encryption Standard (DES).

Wideband data are fed to the transport unit 308 via a wideband port 312 that provides compatibility with 16:9 wide NTSC format. The wideband port is also controlled by the conditional access system. A buffer 314 is used to support the transport chip operations. A 128K×8 static random-access memory (SRAM) with access speed of 70 ns may be used as the buffer 314.

The transport chip 308 routes the video and audio signals to an MPEG decoder 316, while data is made available to a CPU 318. The MPEG decoder 316 provides decompression of the video and audio signals in accordance with the MPEG standard. For example, a single-chip STi3520 MPEG decoder may be used. By way of example, reference is made to U.S. Pat. No. 5,198,901 to Lynch of Mar. 30, 1993; to U.S. Pat. No. 5,293,229 to Iu of Mar. 8, 1994; to U.S. Pat. No. 5,311,310 to Jozawa et al. of May 10, 1994; to U.S. Pat. No. 5,361,105 to Iu of Nov. 1, 1994; to U.S. Pat. No. 5,386,234 to Veltman et al. of Jan. 31, 1995; and to U.S. Pat. No. 5,400,076 to Iwamura of Mar. 21, 1995. Those disclosures and citations referenced therein may be consulted for an understanding of the specific details of conventional MPEG decompression arrangements.

The MPEG decoder 316 of the preferred embodiment is supported by a synchronous RAM 320 formed by four 256K×16 DRAMs with access speed of 70 ns capable of holding 3 full frames of MPEG video and audio data, and control information.

Decompressed video data in YUV format is fed to a digital video encoder 322. The decompressed audio data is supplied to the video encoder 322, and to a stereo audio digital-to-analog converter (DAC) 324 for converting digital audio signals into analog form. A single-chip AK4319 DAC, manufactured by Asahi Kasei, may be used as the DAC 324.

Operations of the satellite receiver 300 are supported by the CPU 318 such as a Motorola 68340 CPU chip running at 16 MHz. An external watch crystal is used to derive the 16 MHz internal clock. The CPU 318 may have a 16-bit external data bus and a 32-bit data bus for internal operations. The CPU 318 may run the PSOS+operating system developed by Integrated Systems Inc.

The CPU 318 is supported by a ROM 324, a SRAM 326 and an EEPROM 328. The ROM 324 that holds the PSOS+ operating system, menus, fonts, and other fixed data may be formed by two 4 Mbit masked ROM chips organized as 512K×8 with access speed of 95 ns.

The SRAM 326 formed, for example, by two 1 Mbit SRAM chips organized as 128K×8 with access speed of 70 ns, may be used for storing all active data such as system stacks, variables, menu data, etc. The ROM 324 and SRAM 326 may operate at a zero wait state to provide maximum performance.

The EEPROM 328, for example, a single 8K×8 EEPROM chip with access speed of 150 ns, may store non-volatile data such as user preferences.

To enhance the graphics presentation capabilities of the satellite receiver 300, a graphics accelerator 330, such as a MCD212 graphics accelerator manufactured by Motorola, is used as a co-processor. The graphics accelerator 330 allows the receiver 300 to increase the rate of screen updates and to provide up to 256 colors in a graphics image. Also, the accelerator provides graphical effects such as wipes, dissolves, fades, etc. during transitions of menus on a TV screen, and supports operations of a remote pointing device such as an Airmouse®. This type of remote pointing device is manufactured by Seletech and Airmouse Remote Controls. The output of the graphics accelerator 330 produced in RGB format is fed to a converting circuit 332 for conversion into YUV format.

The graphics accelerator 330 may be supported by a synchronous 4 Mbit RAM 334 provided, for example, on a single 256K×16 DRAM chip with access speed of 70 ns. The RAM 334 used for storing graphics data is capable of storing two graphics planes with 720×480 pixel resolution. The graphics accelerator 330 allows two graphics planes to be combined to produce various graphical effects.

The graphics data from the conversion circuit 332, and decompressed video and audio data from the MPEG decoder 316, are supplied to separate inputs of the digital video encoder 322 such as a single-chip Phillips 7184 encoder. The video encoder 322 is responsible for encoding digital video, audio and graphics data to produce a combined composite signal in NTSC format. For example, U.S. Pat. No. 5,489,947 to Cooper of Feb. 6, 1996, incorporated herewith by reference, discloses an on-screen display (OSD) arrangement that allows the graphics data to be displayed on a TV set screen together with the image represented by the received video signals, or in place of this image. A single control bit may be used by the video encoder 322 to switch its output from graphics data to video and back.

The video encoder 322 also produces baseband video and audio signals. The baseband video signals are buffered by a pair of video operational amplifiers 336 coupled to video connectors. The baseband audio signals are fed to the stereo audio DAC 324 for converting to analog format and supplying to audio connectors. The video and audio connectors may be coupled to such external devices as stereo receivers, TVs or VCRs.

The combined composite signal from the video encoder 322 may be fed to a NTSC modulator 338 that modulates the composite signal to either channel 3 or 4 of a TV set coupled to the modulator 338. The modulator 338 also allows the combined composite signal to bypass a cable/antenna input of the TV set. Operations carried out to display video and graphical images on the TV set screen will be described in more detail later.

The TV set coupled to the satellite receiver 300 may display graphics data representing a graphical user interface (GUI) that allows a user to control operations of the satellite receiver 300, and provides user access to services and options offered by the digital satellite TV system. For example, graphics on the TV set screen may represent a graphical channel changer that enables a user to select TV channels. Another example of a graphical presentation on the TV screen is an electronic program guide that contains names of TV programs arranged in a 2-dimensional array, in which TV channels are listed vertically, and the time of broadcasting is listed in the horizontal direction. Various aspects of the GUI including the graphical channel changer and the electronic program guide are discussed in more detail later.

A modem 340, such as a single-chip SSI 1200-baud modem, is provided to support communications via a narrowband port 342 used for low bandwidth signal transmission, or via a telephone jack connected to a telephone line. For example, the modem 340 may support remote billing and interactive services.

A microcontroller 344 such as a Phillips 87593 microcontroller provides control of receiver functions relating to control, interface and display devices arranged at the front panel of the satellite receiver 300. Among such devices are a pointing device interface 346, front panel controls 348, and a vacuum fluorescent display (VFD) 350.

The pointing device interface 346 enables a remote optical pointing device such as an Airmouse® to provide a wireless control of the satellite receiver 300. By way of example, reference is made to U.S. Pat. No. 5,045,843 to Hansen of Sep. 3, 1991, and U.S. Pat. No. 5,359,348 to Pilcher et al. of Oct. 25, 1994 for descriptions of Airmouse® arrangements and operation. For example, the pointing device interface 346 may comprise an infrared (IR) transmitter and receiver that provide infrared communications with a pointing device located up to 7 meters away from the receiver 300 at an angle of up to 45 degrees. This type of remote pointing device has been used principally for moving the cursor of a personal computer.

The Airmouse® type pointing device in accordance with the invention points directly at a TV set screen to provide direct interactions between the user hand that holds the pointing device, and the TV screen. The pointing device may comprise a cursor control circuit that moves a cursor on the TV screen in response to the position of the pointing device with respect to, for example, the IR transmitter at the front panel of the receiver. The pointing device interface 346 supports the GUI by providing and controlling the RF tuner 302 of the satellite receiver to respond to random, instant user access to any point on the TV screen. Selections are made by clicking one of the buttons on the pointing device. For example, at any time when there is no menu on the screen, a first click provides a basic control bar of menus across the bottom of the screen. The control menu bar remains active for a preset period, after which it is made invisible if no further signals from the pointing device are detected. Interactions between the GUI and remote pointing device are disclosed in more detail in our copending application Ser. No. 08/720,501, entitled "TELEVISION GRAPHICAL USER INTERFACE EMPLOYING REMOTE RANDOM ACCESS POINTING DEVICE," filed concurrently herewith and incorporated by reference.

In addition to the optical pointing device, a remote hand held control unit of the satellite receiver 300 may also include several dedicated buttons to provide, for example, switching power ON and OFF, channel and volume control, selection between regular TV broadcasting and satellite broadcasting, etc.

The front panel control 348 provides control of the GUI in the event that the remote pointing device is missing or non-operable. The controls 348 may include a TV/Satellite receiver key for switching between regular TV broadcasting and satellite broadcasting. Set-up, menu, clear, select or "click" keys may be provided to control modes of operation. Cursor keys may be arranged to move the cursor on the TV screen in various directions.

The VFD 350 is provided to show current TV channel number and time. Also, the VFD 350 may indicate current incoming signal strength and other operational information.

Figure 2:
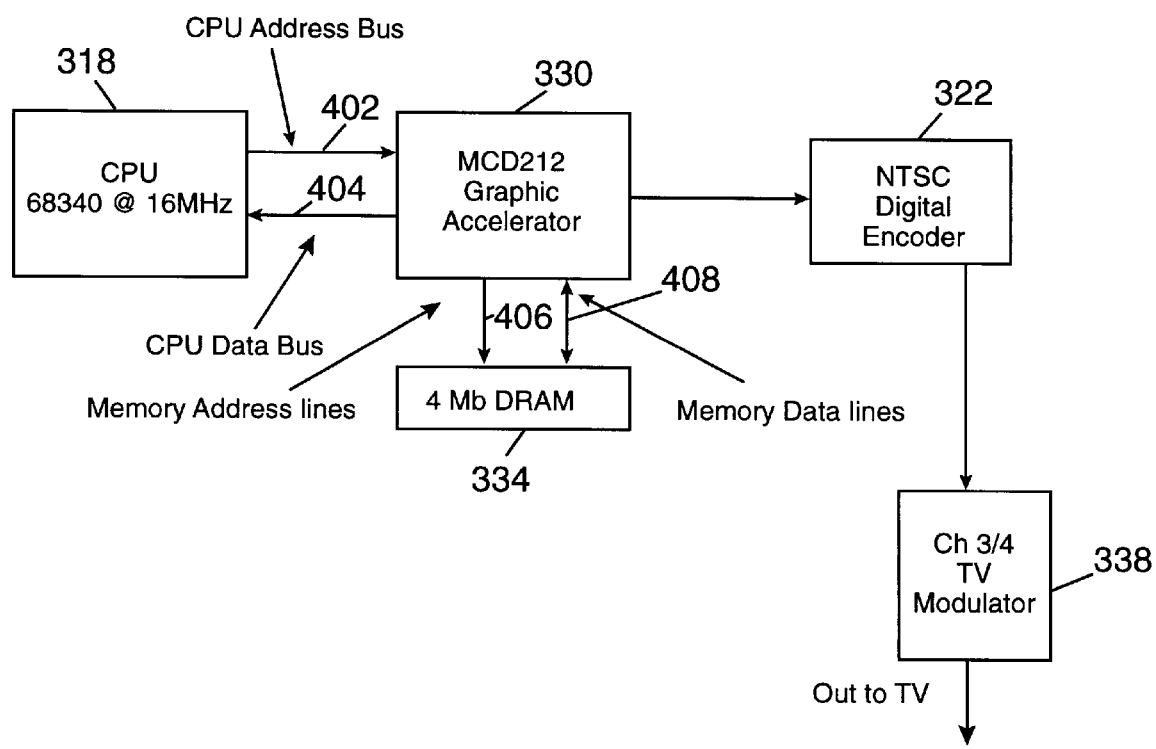
FIG. 2 is a block diagram illustrating a graphical object drawing procedure.

Reference is now made to FIG. 2 that illustrates drawing color graphic objects on a TV screen according to the present invention. As discussed above, the CPU 318 interacts with the graphics accelerator 330 used as a co-processor to enhance the graphics capability of the satellite receiver 300. The CPU 318 may be coupled to the graphics accelerator 330 via an external 24-bit address bus 402 and a 16-bit data bus 404. The 24-bit address bus 402 enables the CPU 318 to address up to 16 Mbytes of a graphics memory. This storage capacity corresponds to an address space from 000000 to ffffff in hexadecimal notation. Various graphics memory arrangements may be organized in this address space, as long as each memory location is uniquely addressable. For example, the capacity of the graphics memory 334 may be equal to 4 Mbit or 512 Kbytes. Assuming that the graphics memory address space corresponds to the middle part of the system memory map, the $800000 hex address may be selected as the lowest graphics memory location, and the $87ffff hex address may be designated as the top graphics memory address. The graphics memory 334 may be coupled to the graphics accelerator 330 via memory address lines 406 and memory data lines 408.

The graphics accelerator 330 enables a TV set to display up to 16 million different colors. However, only 256 different colors can be displayed on any one screen at any given time. As a result, each unique pixel displayable on a TV screen can be represented by a single 8-bit value. Thus, each pixel stored in the 512 Kbyte graphics memory 334 is represented by a single 8-bit value or byte.

Each graphics plane stored in the graphics memory 334 is provided by a rectangular array of 720×480 pixels representing a picture on the TV screen. For example, the pixels may be stored in the graphics memory 334 from top left to bottom right in row order. Thus, the top left hand pixel of the screen resides at the $800000 hex graphics memory location. The second pixel on the top line 1 is stored at $800001 hex, etc. The last pixel of the top line 1 is held at $8002D0 hex. The first pixel of the next line 2 is at the $8002D1 hex graphics memory location, etc. The bottom right hand corner of the screen corresponds to the $8545ff location of the graphics memory 334. Thus, the graphics memory arrangement corresponds to a rectangular X,Y-coordinate system on the TV screen, where 720 pixels in each line of the array are arranged in the horizontal direction X, and 480 pixels in each row of the array are arranged in the vertical direction Y.

The graphics accelerator 330 contains a color look up table (CLUT) that converts 256 elements representing 8-bit pixel values stored in the graphics memory 334 into 24-bit values composed of red (R), green (G), and blue (B) bytes corresponding to R, G, and B components of a picture in RGB format. The CLUT may be programmed by the CPU 318 to reproduce any color possible in a 24-bit color space.

Figure 3:
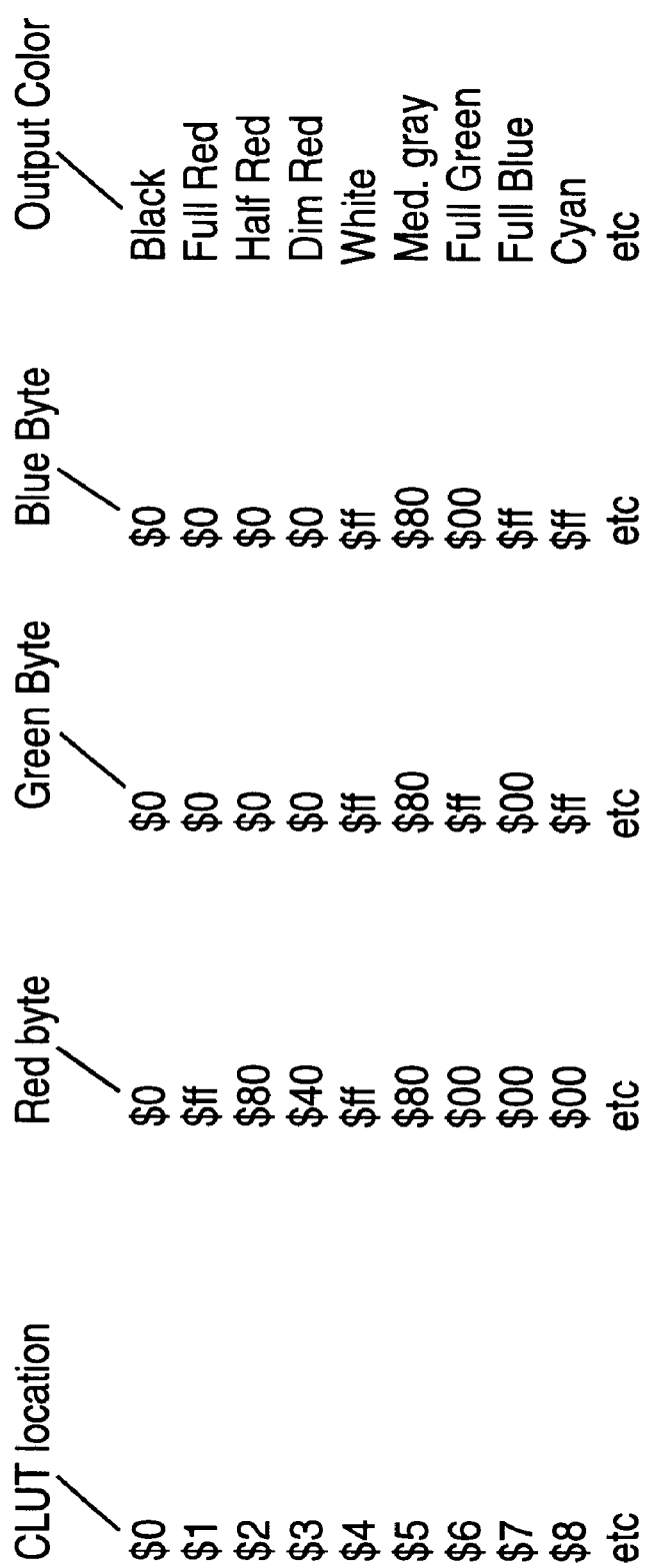
FIG. 3 illustrates contents of a color look up table.

FIG. 3 illustrates some typical colors reproducible by the CLUT. For example, black color composed of red, green and blue bytes represented by $0 hex may correspond to the $0 hex location of the CLUT. White color composed of the $ff hex red, green and blue bytes may correspond to the $4 hex CLUT location, etc.

When the CLUT is programmed, the CPU 318 accesses the graphics memory 334 to write data values representing graphics. The graphics accelerator 330 scans the graphics memory 334 at a rate of 13.5 MHz to read the graphics data. Each 8-bit pixel value is transferred to the CLUT that converts it into a 24-bit color value in RGB format. As discussed above, the converter 332 converts the RGB color value into YUV format, and passes a 24-bit digital YUV value to the digital encoder 322 that converts it into analog NTSC luminance and chrominance signals, for example, at a 13.5 MHz rate. The NTSC encoding procedure carried out by the encoder 322 is well known to those skilled in the art. The analog luminance and chrominance signals via the TV modulator 338 are supplied to the TV set.

Figure 4:
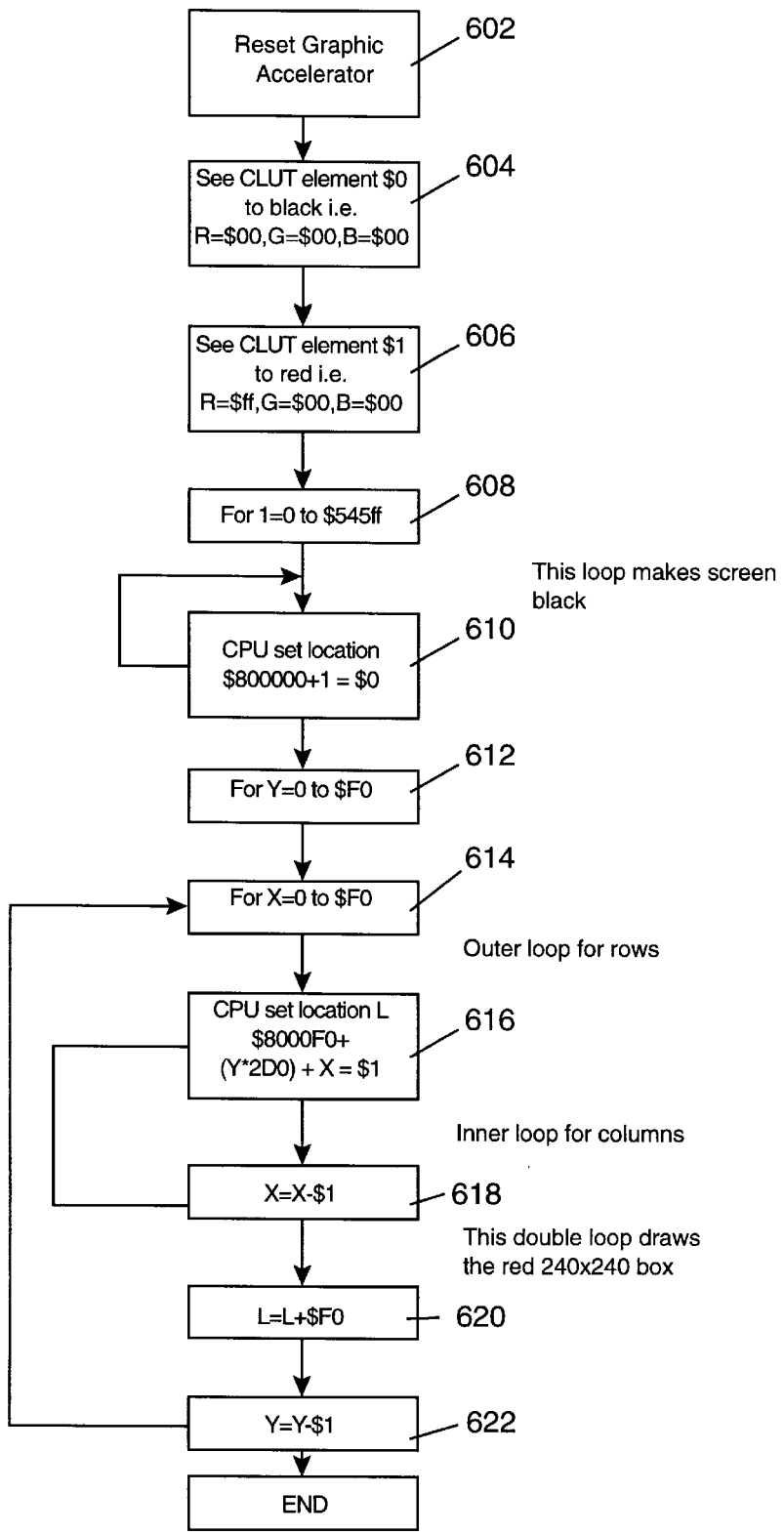
FIG. 4 is a flow chart illustrating an example of interactions between a CPU and graphics accelerator.

FIG. 4 shows a flow chart that illustrates an example of interactions between the CPU 318 and graphics accelerator 330 to draw a 240×240 pixel red square in the middle of a TV screen with a black background. In step 602, the CPU 318 resets the graphic accelerator 330. In step 604, the CPU 318 programs the CLUT in the graphics accelerator 330 so as to set CLUT location $0 hex to reproduce black color, i.e. red, green and blue bytes in this location are set to $0 hex. In step 606, the CPU 318 sets CLUT location $1 hex to reproduce red color, i.e. a red byte in this location is set to $ff hex, and green and blue bytes are set to $0 hex.

In steps 608 and 610, the CPU 318 carries out a loop to make the TV screen black. Locations $800000+I of the graphics memory 334 are set to $0 hex, for I that varies from $0 hex to $545ff hex.

In steps 612–622, the CPU 318 performs a double loop to draw the red 240×240 pixel box on the screen. The double loop comprises an outer loop carried out to set pixels in rows (Y-direction on the screen) of the graphics memory 334 to $1 hex to reproduce them in red color, and an inner loop to set pixels in lines (X-direction) of the graphics memory 334 to $1 hex to reproduce them in red color.

Figure 5:
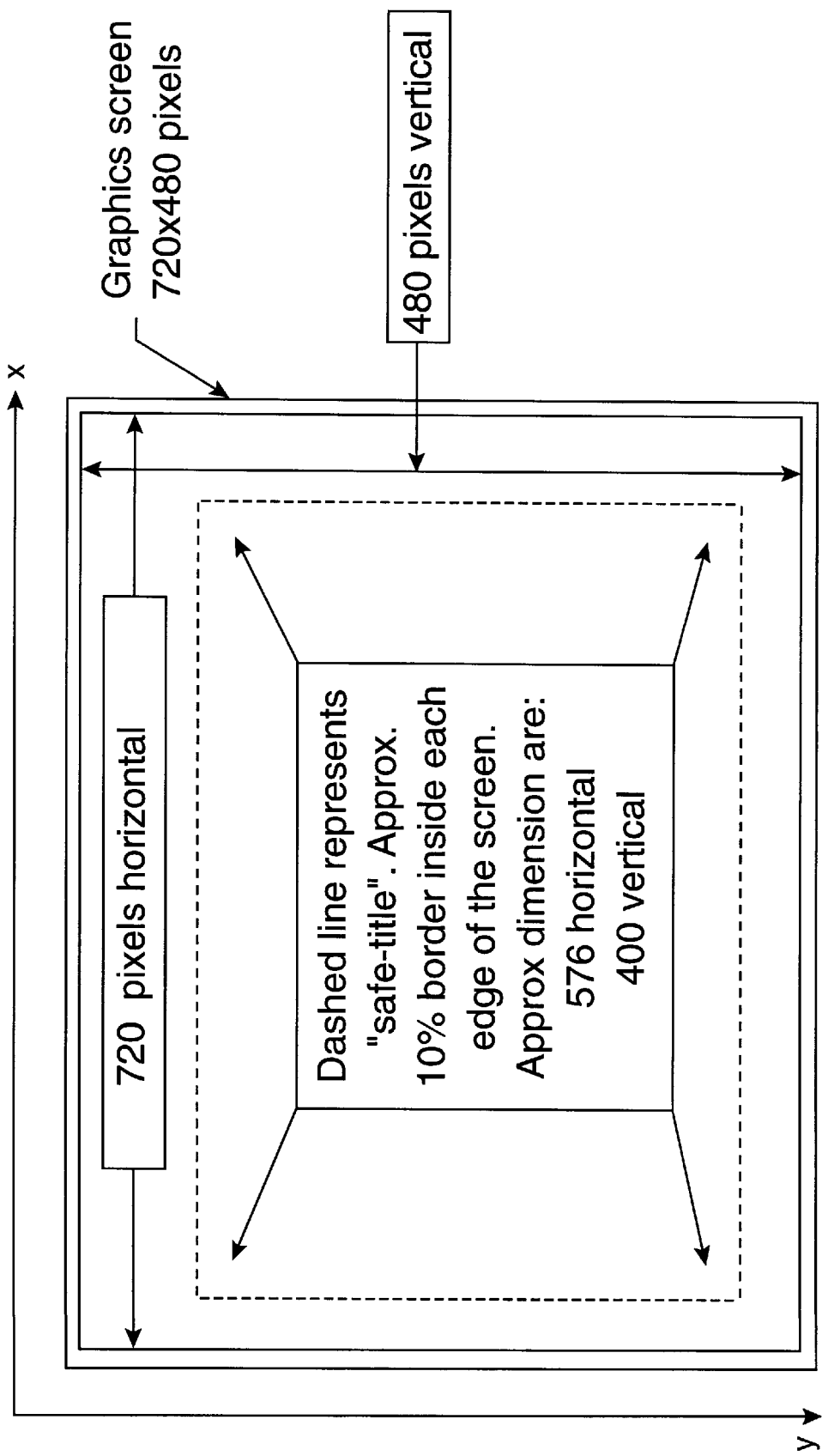
FIG. 5 is a diagram illustrating arrangement of pixels on a TV screen.

Graphical objects displayed on the TV screen are represented by a 2-dimensional array of pixels. For example, as shown in FIG. 5, the TV screen may be represented by a 720×480 array of pixels corresponding to a graphics plane stored in the graphics memory 334. 720 pixels may be arranged on the screen in the horizontal direction X, whereas 480 pixels may be arranged in the vertical direction Y. To perform graphics drawing operations, the CPU 318 may use an X, Y-coordinate system shown in FIG. 5, wherein coordinates X=0, Y=0 represent the top left hand corner of the TV screen, and coordinates X=720, Y=480 represent the bottom right hand corner of the screen.

It should be noted that due to "overscan" conditions, a television receiver may produce a raster on its screen so that pixels in the horizontal and vertical directions may not be entirely in the view of the user. Therefore, TV broadcast systems prevent images from being displayed outside of a "safe title" area located within approximately a 10% border all around the edge of the screen. As shown in FIG. 5, the safe title area contains approximately 576 pixels in the horizontal direction, and 400 pixels in the vertical direction. With such a scheme, the top left hand corner of the safe title area is located at position X=72, Y=40. The bottom right hand corner of the safe title area has coordinates X=648, Y=440. On the discussed below diagrams that illustrate the functional modes of the GUI, an outer solid-lined box represents the edge of the TV screen, and a dash line shows the border of the safe title area. The graphical objects displayed in various GUI modes are drawn in accordance with the graphical object drawing procedure discussed above in connection with FIGS. 2–4.

Figure 6:
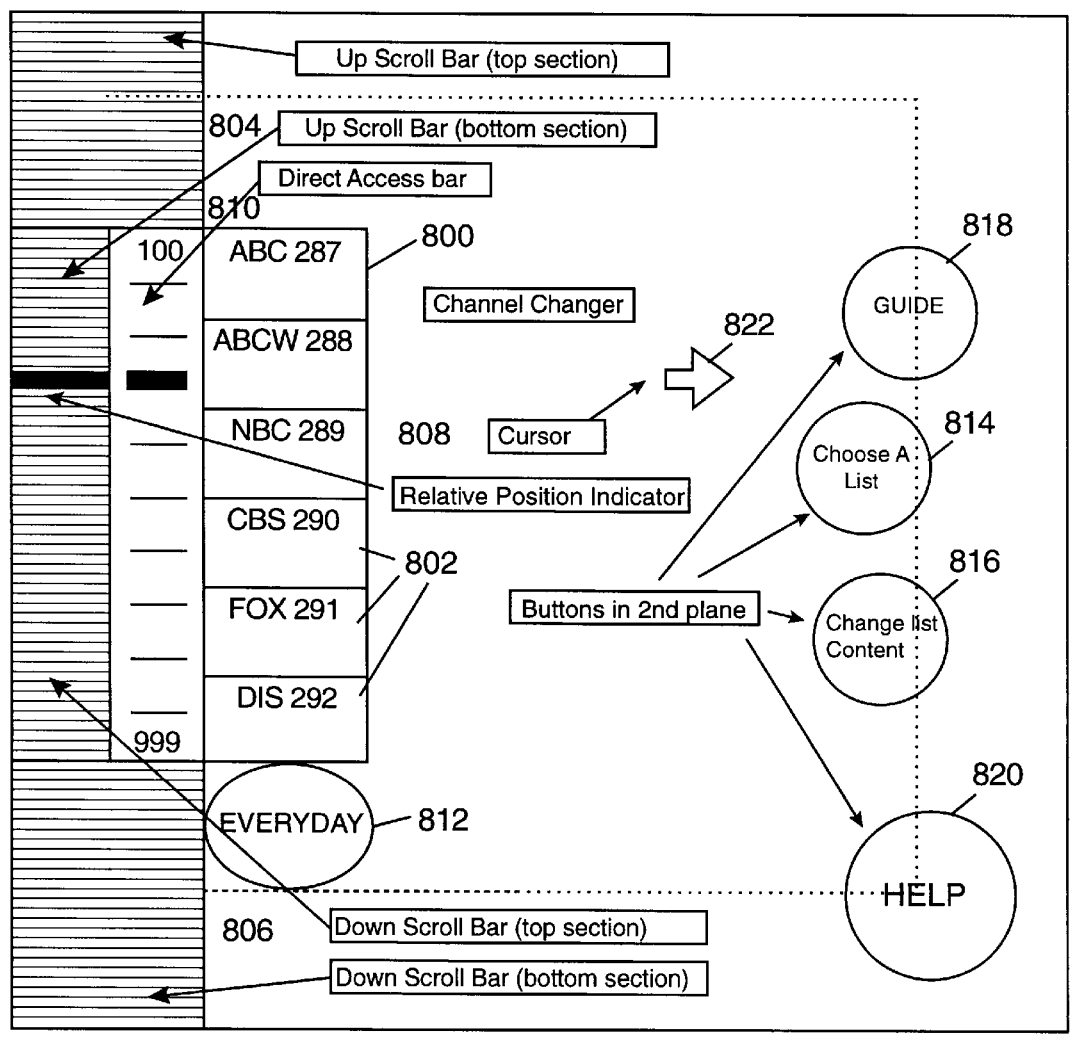
FIG. 6 is a diagram illustrating the TV GUI in a channel selector mode.

Referring to FIG. 6, when the TV GUI of the present invention is placed in a channel changer mode that enables users to select TV channels, a TV set coupled to the satellite receiver 300 displays a graphical channel changer 800 having a vertical channel bar that includes graphical channel boxes 802 representing TV channels available in the satellite receiver 300. For example, each box 802 may contain number and logo of a TV channel. In a digital satellite TV system, the channel bar may represent about 1,000 TV channels. A restricted number of the boxes 802 may be displayed on the TV screen at any given time. For example, FIG. 6 shows that six boxes 802 representing channels 287–292 are simultaneously displayed. The vertical channel bar may be represented is by 120×300 pixels. For example, its top left corner may have coordinates X=122, Y=90, and its bottom right corner may be arranged at X=242, Y=390.

Up and down scroll bars 804 and 806 may be arranged near the channel bar to allow a user to move up and down through the entire list of TV channels. For example, the scroll bars 804 and 806 shown in FIG. 6 represents channels 100 through 999. A single click of the pointing device button causes the channel changer 800 to move up or down by one channel with respect to the TV channels currently represented in the channel boxes 802. For example, when the user clicks the pointing device held in the direction of the up scroll bar 804, the boxes 802 will shift from channels 287–292 to channels 286–291. If the pointing device points at the down scroll bar 806, a single click will cause the boxes 802 to move from channels 287–292 to channels 288–293. Holding down the pointing device button may cause the list of TV channels to scroll continuously. A relative position indicator 808 shows the position of the TV channels currently displayed in the channel boxes with respect to other TV channels.

It may be difficult to find a required channel among 1,000 channels provided by satellite TV, when the user does not know the number of the required channel. A direct access channel bar 810 presented next to the channel bar has a graduated scale representing available TV channels. The numbers of the first and last channels are respectively placed on the top and bottom of the scale. For example, the channel bar 810 has numbers 100 and 900 on its top and bottom indicating that TV channels 100 through 900 are represented. When a user points the pointing device at a selected region of the channel bar 810, the channel boxes 802 display numbers and logos of TV channels represented by that selected region. Operations of the direct access channel bar 810 are disclosed in more detail in our copending application Ser. No. 08/746,694, entitled "TELEVISION GRAPHICAL USER INTERFACE HAVING CHANNEL CONTROL BARS," filed concurrently herewith and incorporated by reference.

The graphical channel changer 800 allows the user to include any combination of TV channels into a channel list to be displayed. An oval object 812 may be arranged below the channel bar to indicate the name of the currently selected channel list. Graphical buttons Choose a List and Change List Content 814 and 816, respectively, allow the user to select a channel list and to change the contents of the list.

When the user directs the remote pointing device at a graphical button GUIDE 818, the graphical channel changer 800 is transformed into an electronic program guide, as discussed in more details later. A graphical button HELP 820 causes the TV GUI to switch into a help mode to assist the user in navigating through graphical options. Each component of the graphical channel changer may be displayed using the above-discussed procedure of drawing color graphic objects on a TV screen.

To switch the TV set to a required TV channel, the user directs the pointing device at the graphical channel box 802 that contains the number and logo of the required channel. The movement of the pointing device held in the user's hand causes a cursor 822 to move to the required graphical channel box 802. The coordinates of the pointing device may be supplied to the microcontroller 344 on a periodic basis, for example, 60 times a second. The CPU 318 generates X, Y coordinates corresponding to a path for moving the cursor in alignment with pointing device movement. Cursor movement is achieved by multiple erasures and redraws of the cursor image performed on the path to the selected position. When the cursor 822 passes over any channel box 802, that box will be highlighted. When the required cursor position is reached, the user may press a select button on the pointing device to tune to the required channel. In response to the user command, the CPU 318 sends a tune command to the RF tuner 302 to tune the satellite receiver 300 to the required TV channel.

When the user moves the cursor 822 over any of the graphical buttons, they change their color to show to the user that the corresponding button is active and if clicked on will cause the system to perform the required task.

As discussed above, the RAM 334 used for storing graphics data is capable of storing two graphics planes. Each of them is composed of a rectangular array of 720×480 pixels representing a picture on the TV screen. The graphics accelerator 330 allows two graphics planes to be combined to produce various graphical effects.

For instance, while the channel changer 800 and the icons 804–812 that surrounds the channel changer 800 are stored in the first graphics plane, the buttons 814–820 on the right hand side of the screen are stored in the second graphics plane. However, the buttons 814–820 are displayed in the channel changer mode simultaneously with the image stored in the first plane.

The CPU 318 controls the graphics display system so as to display objects stored in the second graphics plane beneath the objects stored in the first graphics plane. Thus, the channel changer 800 and the icons 804–812 are displayed in the upper layer of the GUI on the screen, whereas the graphical buttons 814–820 are displayed in the lower layer of graphics covered by the upper layer. To allow the buttons 814–820 to be visible, the image in the first plane is made transparent at the right hand side of the screen. As illustrated in FIG. 6, the cursor 822 is displayed over the upper layer of graphics.

Figure 7:
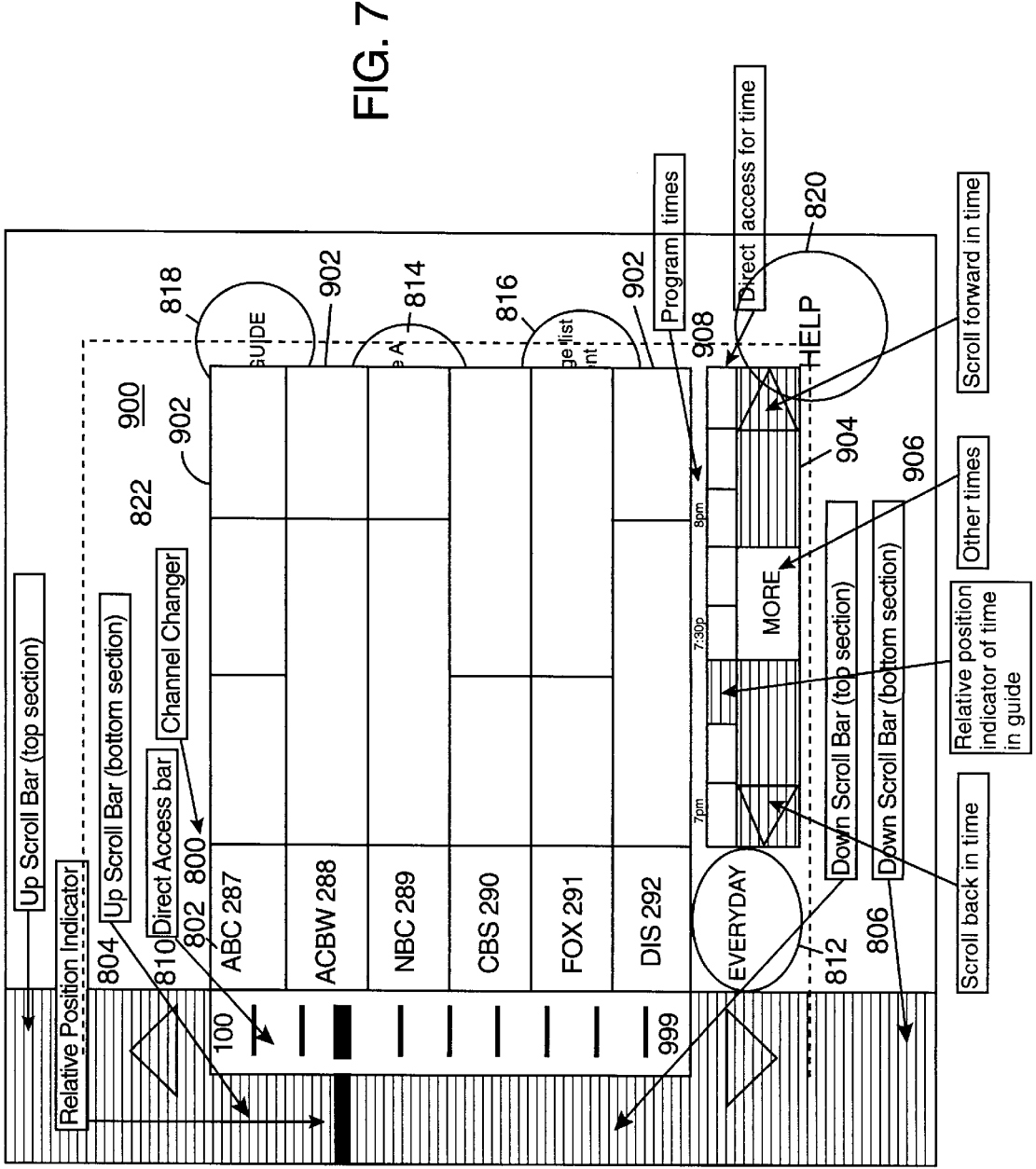
FIG. 7 is a diagram illustrating the TV GUI in a program guide mode.

Reference is now made to FIG. 7 that illustrates a program guide mode that enables users to view TV programming information for various TV channels. To Die from the channel changer mode to the program guide mode, the user may click the pointing device held in the direction of the GUIDE button 818 on the screen. Switching from one mode into another is disclosed in more detail in our copending application Ser. No. 08/720,500, entitled "TELEVISION GRAPHICAL USER INTERFACE THAT COMBINES ELECTRONIC PROGRAM GUIDE WITH GRAPHICAL CHANNEL CHANGER," filed concurrently herewith and incorporated by reference.

In the program guide mode, the TV GUI of the present invention displays an electronic program guide 900 based on the graphical channel changer 800. This arrangement allows users to review TV programming information, and then, to select a TV channel that carries a desired TV program by directing the remote pointing device at the channel box 802 for the selected TV channel.

In addition to the channel changer 800, the program guide 900 comprises horizontal program bars 902 that indicate TV programs carried by TV channels during a predetermined time period. For example, ninety minutes of programming may be shown. Each horizontal program bar 902 is aligned with the channel box 802 representing the TV channel that carries the TV programs indicated in that program bar 902. Below the horizontal bars 902 are time legends that indicate the time of the TV programs represented by the horizontal bars 902. For example, the electronic program guide 900 shown in FIG. 7 contains TV programming from 7 p.m. to 8.30 p.m.

A horizontal time scroll bar 904 may be arranged below the time legends to enable the user to look at a TV program schedule before and after the time indicated by the time legends. A graphical button MORE 906 allows the user to select any time period for which a TV program schedule is required. A direct access time bar 908 similar to the direct access channel bar 810 enables the user to access a TV program schedule for a selected region of the time bar 908 by directing the pointing device at the selected region. Further, the TV GUI operating in the program guide mode may maintain the up and down channel scroll bars 804 and 806, and the direct access channel bar 810.

As shown in FIG. 7, the graphical buttons Choose a List 814, Change List Content 816, GUIDE 818 and HELP 820 are displayed on the right hand side of the screen. The buttons 814–820 are partially covered with the program bars 902.

In the program guide mode of the TV GUI, the graphical objects of the program guide 900 are stored in the first graphics plane of the graphics data RAM 334, together with the channel changer 800 and the elements 802–812 associated with the channel changer 800. The graphical buttons Choose a List 814, Change List Content 816, GUIDE 818 and HELP 820 are stored in the second graphics plane of the RAM 334. The CPU 318 controls the graphics display system to display the elements of the first graphics plane in the upper layer on the screen, whereas the elements of the second graphics plane are displayed in the lower layer of graphics underneath the elements of the first graphics plane.

To facilitate GUI control operations, positions of the graphical buttons 814–820 on the screen in the program guide mode remain the same as in the channel changer mode. Although in the program guide mode the graphical buttons 814–820 are partially covered with the program guide bars 902 displayed in the upper layer of graphics, the buttons 814–820 are still clearly visible to users. As the buttons 814–820 remain in the same position as in the channel changer mode, they create the impression of continuity between the program guide mode and the channel changer mode.

To increase this impression, as the user moves cursor to the right hand side of the screen, the right hand side of the upper layer of graphics is made transparent to fully uncover the buttons in the lower layer. Thus, the upper layer of graphics appears to fold back in accord with cursor movement.

Figure 8:
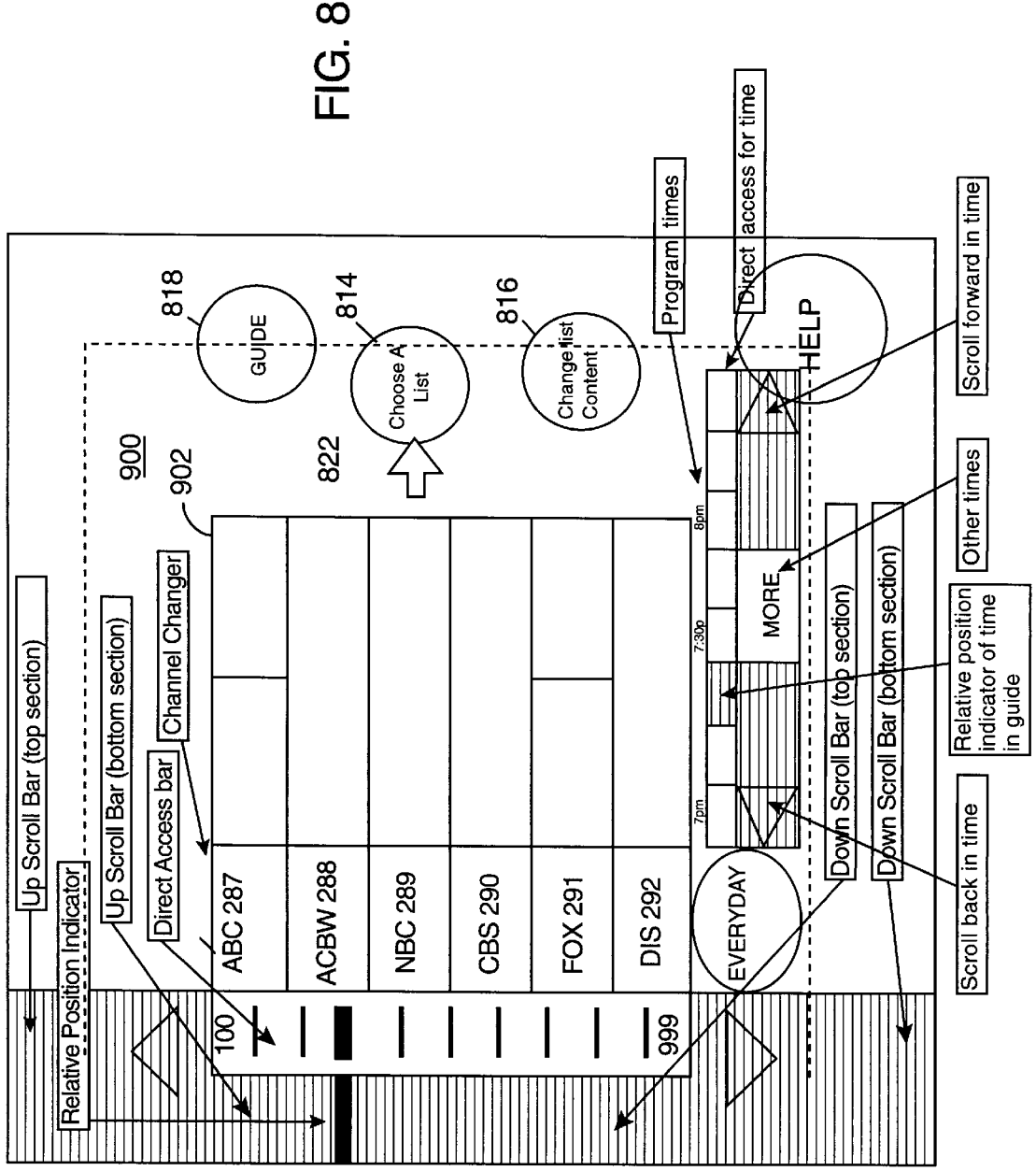
FIG. 8 is a diagram illustrating the TV GUI in a reduced program guide state.

The cursor 822 in FIG. 7 is positioned in the middle of the screen. As illustrated in FIG. 8, when the cursor 822 is positioned at the right hand side of the screen, the portion of the program guide bars 902 at the right hand side is made transparent to leave the Choose A List button 814, Change List Content 816, and GUIDE 818 completely exposed. Thus, the GUI adjusts the size of the program guide 900 in accordance with the position of the cursor 822 to produce a visual effect that gives the user impression that the channel changer mode is easily accessible.

Figure 9:
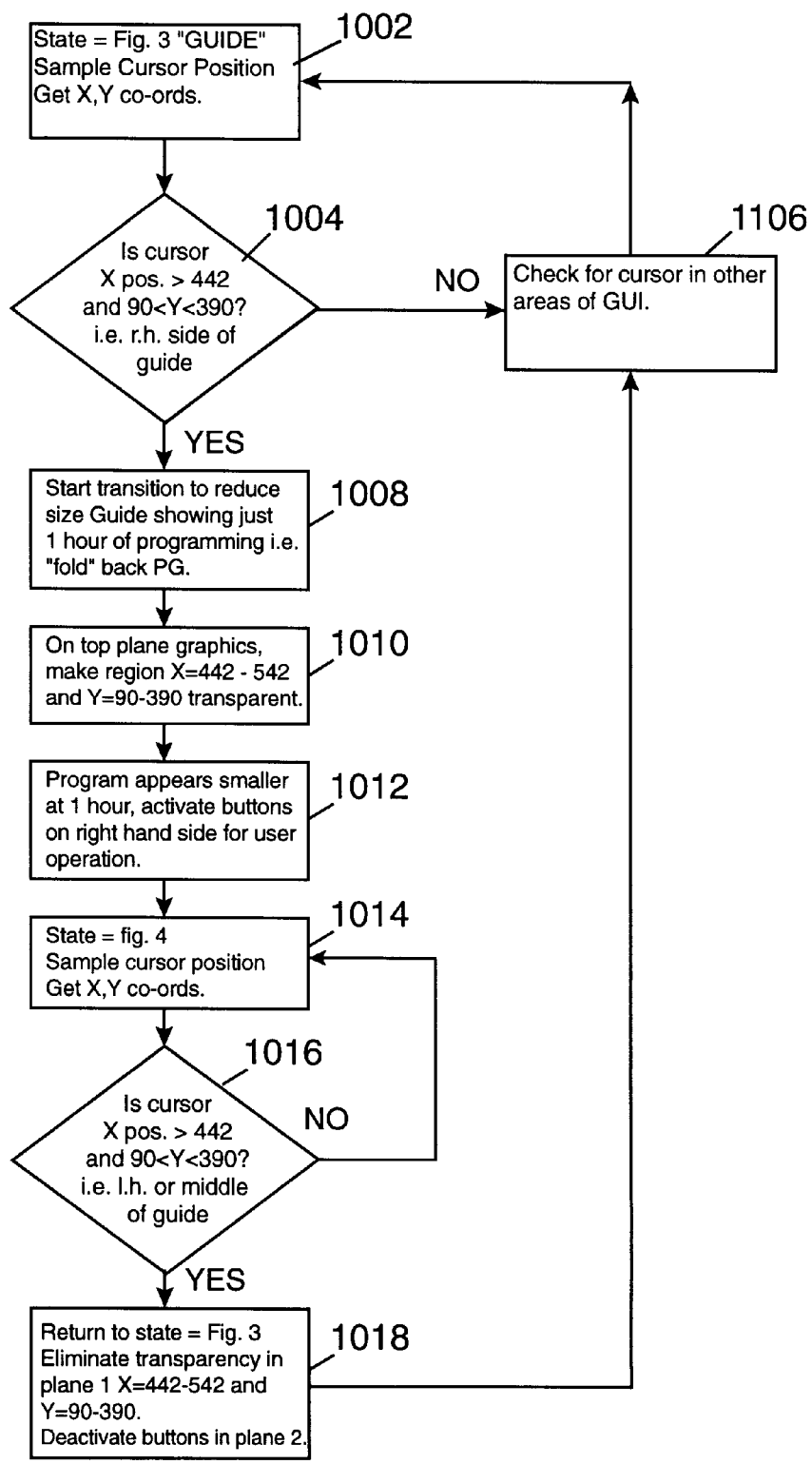
FIG. 9 is a flow chart illustrating a program guide adjustment procedure.

Reference is now made to FIG. 9 showing a flow chart that illustrates a procedure of adjusting an image in the upper layer of graphics to provide a required visual combination with images in the lower layer. For example, when the TV GUI is set in the program guide mode shown in FIG. 7, the system checks a pointing device position to move the cursor 822 in response to a position change, and generates X, Y coordinates defining cursor movement (step 1002).

In step 1004, the system determines whether or not the cursor 822 is over the region with coordinates X>442, 90<Y<390, i.e. at the right hand side of the screen. If not, step 1006 is carried out to check other areas of the GUI, and the system goes back to the step 1002. If the cursor is positioned over the defined region, the transition to the reduced program guide shown in FIG. 8 commences (step 1008). For example, the reduced program guide may show TV programming information only for the next one hour.

To reduce the size of the program guide, the CPU 318 interacts with the graphics accelerator 330 to form the transparent region with coordinates 442<X<542, 90<Y<390 in the upper layer of graphics (step 1010). This region is made transparent using the graphic object drawing procedure described above in connection with FIGS. 2–4.

In step 1012, the reduced program guide shown in FIG. 8 is displayed on the TV screen. The buttons 814–818 in the lower layer of graphics at the right hand side of the screen exposed by the transparent region in the upper layer of graphics are activated to enable users to perform operations initiated when the pointing device is directed at these buttons.

In the reduced program guide state, the system continues to monitor cursor movement to obtain X, Y coordinates of the cursor 822 (step 1014). In step 1016, the system determines when the cursor 822 is moved out of the right hand side of the screen. In particular, the CPU 318 checks whether or not the cursor 822 is over the region with coordinates X<442, 90<Y<390. If the cursor is positioned over this region, the GUI returns to the regular program guide state shown in FIG. 7 (step 1018). In the upper layer of graphics, the transparency of the region with coordinates 442<X<542, 90<Y<390 is eliminated. The portions of the horizontal program bars 902 removed in the reduced program guide state are added. The buttons 814–818 in the lower layer of graphics at the right hand side of the screen are deactivated.

There accordingly has been described a TV graphical user interface (GUI) that provides a multi-layered graphical presentation. The TV GUI operates in a channel changer mode to enable a user to tune to a required TV channel, and in a program guide mode to show TV program information. A memory for storing graphics data is capable of storing two graphics planes that represent upper and lower layers of graphics displayable on a TV screen. A graphics accelerator combines the graphics planes to produce various graphical effects on the screen. In the channel changer mode, the right hand side of the upper layer is made transparent to expose graphical buttons formed in the lower layer of graphics. In the program guide mode, the graphical buttons are partially covered by a program guide formed in the upper layer. When the user moves a cursor to the right hand side of the screen, the right hand portion of the program guide is made transparent to fully expose the graphical buttons in the lower layer.

Thus, in the program guide mode, the TV GUI of the present invention adjusts the size of the program guide in the upper layer of graphics in accordance with cursor movement to expose a predetermined region of the lower layer of graphics exposed in the previous mode of operation. Such an arrangement eliminates the need for a multi-menu hierarchical system for switching between various modes of operation.

In this disclosure, there are shown and described only the preferred embodiments of the invention, but it is to be understood that the invention is capable of changes and modifications within the scope of the inventive concept as expressed herein.

What is claimed is:

1. A television (TV) system comprising:
   a CPU, and
   a TV monitor controlled by said CPU for displaying on a TV screen a TV program guide in a first layer of graphics, and at least one graphical object in a second layer of graphics underneath said first layer,
   wherein the CPU is configured to automatically adjust the size of said TV program guide in accordance with a position of a cursor to expose at least a portion of said graphical object.

2. The system of claim 1, wherein said TV monitor displays a channel selector and said graphical object in a channel selection mode.

3. The system of claim 2, wherein said TV monitor displays said TV program guide and said graphical object in a program guide mode, and said TV program guide and said graphical object being concurrently accessible.

4. The system of claim 3, wherein said TV program guide partially covers said graphical object when said cursor is outside a predetermined region on the TV screen.

5. The system of claim 4, wherein the size of said TV program guide is reduced to fully expose said graphical object when said cursor is over said predetermined region on the TV screen.

6. The system of claim 5, wherein a portion of said TV program guide is made transparent to expose said graphical object.

7. The system of claim 6, wherein said graphical object comprises an icon for controlling TV operations.

8. The system of claim 7, wherein said icon is activated when said graphical object is fully exposed.

9. The system of claim 8, wherein said icon is deactivated when said graphical object is partially covered by said TV program guide.

10. The system of claim 9, wherein said TV program guide comprises TV program objects for indicating TV programs for a first time period when said cursor is outside said predetermined region on the TV screen.

11. The system of claim 10, wherein said TV program objects are reduced to indicate TV programs for a second time period less than said first time period, when said cursor is over said predetermined region on the TV screen.

12. The system of claim 1, further comprising a graphics data memory for storing multiple graphics planes that represent multiple layers of graphics that are concurrently displayable and accessible on the TV screen.

13. The system of claim 12, further comprising a graphics accelerator for combining said graphics planes to produce various graphical effects on the screen.

14. In a television system, a method for displaying a graphical user interface (GUI), comprising the steps of:
   producing a TV program guide in a first layer of graphics displayed on a TV screen,
   producing at least one graphical object in a second layer of graphics underneath said first layer, said graphical object being partially covered by said TV program guide, said first layer and said second layer being contemporaneously accessible, and
   reducing the size of said TV program guide to fully expose said graphical object automatically when a cursor is moved into a predetermined region on the TV screen.

15. The method of claim 14, further comprising the step of automatically increasing the size of said TV program guide to partially cover said graphical object when the cursor is moved out of said predetermined region.

16. The method of claim 15, further comprising the step of producing a TV channel selector in said first layer to fully expose said graphical object in said second layer of graphics, and said first layer and said second layer being concurrently viewable and accessible.

17. The method of claim 14, further comprising the step of storing graphics data in first and second graphics planes respectively, and said graphics data being concurrently displayable and accessible in said first and second layers of graphics.

18. A system for displaying a graphical user interface comprising:
   a CPU, and
   a display controlled by said CPU for displaying a first graphical object in a first layer of graphics, and a second graphical object in a second layer of graphics underneath said first layer, wherein a first predetermined portion of said first graphical object is made transparent in a first mode to expose a predetermined portion of said second graphical object.

19. The system of claim 18, wherein a second predetermined portion of said first graphical object is made transparent in a second mode to fully expose said second graphical object.

* * * * *